Dec. 28, 1943.   E. W. GENT   2,337,883
PNEUMATIC TICKET RECEIVING VALVE
Filed Dec. 23, 1941   2 Sheets-Sheet 1
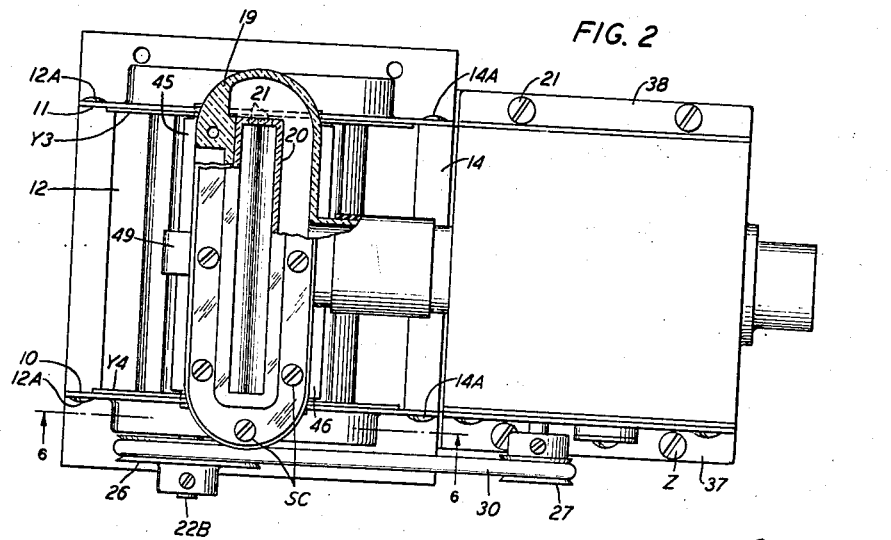
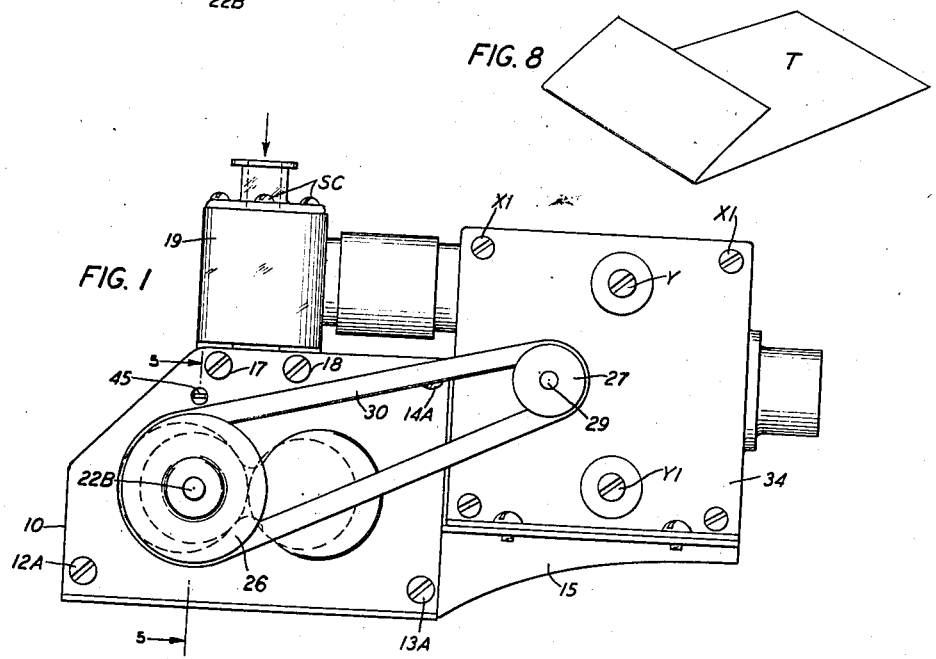
INVENTOR
E. W. GENT
BY
J. MacDonald
ATTORNEY

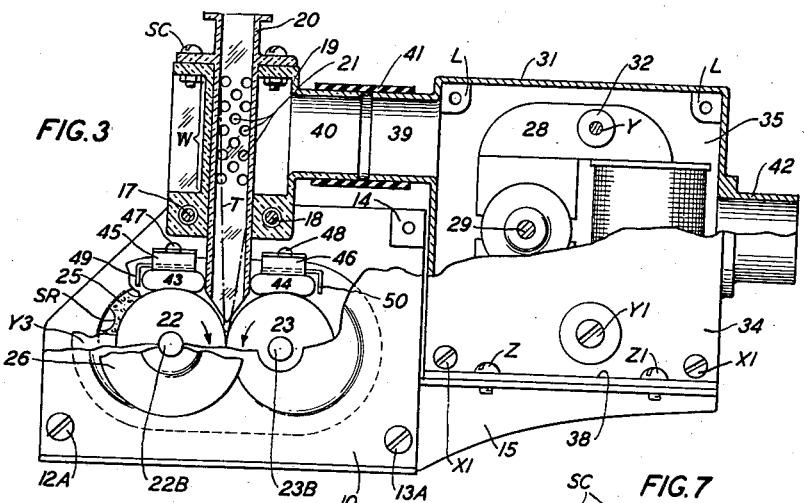
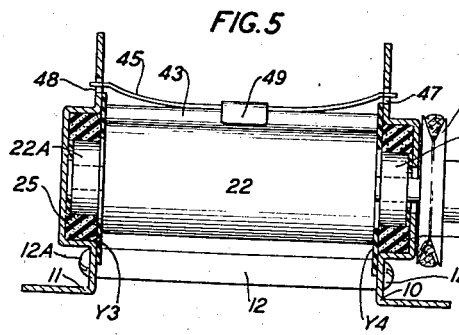
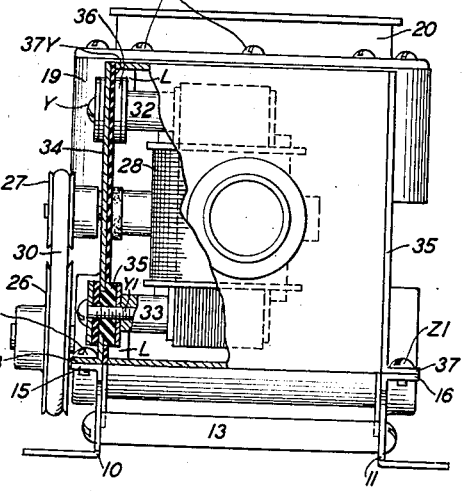
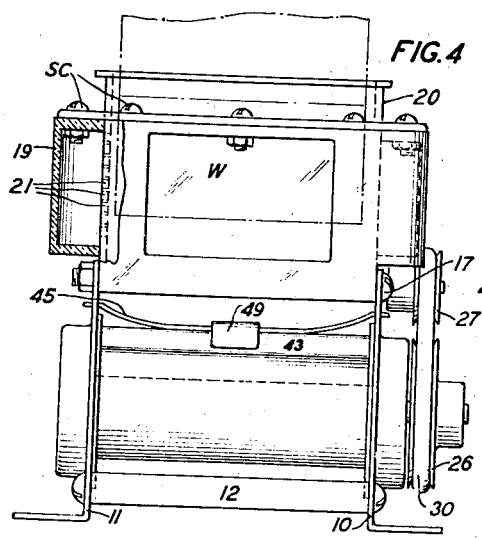
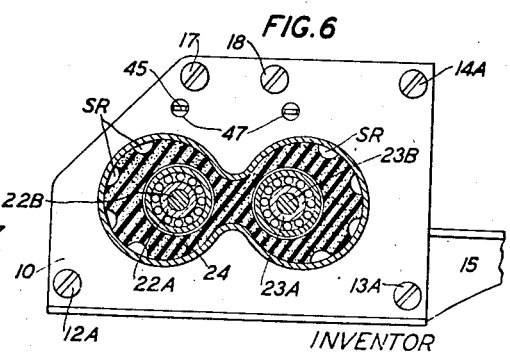
INVENTOR
E. W. GENT
BY J. MacDonald
ATTORNEY Patented Dec. 28, 1943

2,337,883

UNITED STATES PATENT OFFICE 2,337,883

PNEUMATIC TICKET RECEIVING VALVE

Edgar W. Gent, Morristown, N. J., assignor to Bell Telephone Laboratories, Incorporated, New York, N. Y., a corporation of New York Application December 23, 1941, Serial No. 424,136

3 Claims. (Cl. 302—2)

This invention relates to pneumatic ticket distributing systems and more specifically to ticket roller receiving valves for use in such systems.

The object of the invention is to improve the construction and operation of said pneumatic ticket receiving valves, while decreasing their upkeep and manufacturing cost.

In accordance with this invention, a pneumatic ticket receiving valve of the roller type is provided in which a pair of metallic plates, which are secured in parallel spaced relation to each other, are formed with means to one side thereof for receiving inserts of rubber into which bearings for a driving and a driven roller are embedded, the resiliency of the rubber permitting the axial displacement of the rollers upon the passing of tickets therebetween, while normally holding these rollers in contacting relation to each other with a predetermined contact pressure therebetween.

Means in the form of a tubing element constructed of transparent material is provided for guiding the tickets toward the engaged point of the rollers, with a plurality of means in the form of spring-pressed bars engaging the rollers and the opposite sides of the tubing element to form air seals between this ticket guiding tube and the rollers.

Means in the form of a casing of transparent material serves as a mounting for the ticket guiding tube, while serving as a spacer for the metallic plates, the casing and the ticket guiding tube permitting the visual observation of the tickets in their transit toward the receiving end of the valve as effected by the air stream into the pneumatic tube connected to the valve, and the operation of the rollers. Means operatively connects one of the rollers to a motor in a manner that the axial displacement of this roller due to the passage of one or a plurality of tickets simultaneously between the driven and driving rollers causes the tensioning of the driving belt so as to prevent it from slipping over the pulleys due to the added contact pressure between these rollers, while a casing which is connected to the return side of the pneumatic tube serves as a housing for the motor which is kept at a relatively low temperature while in operation by the air stream passing therethrough.

Other novel features and advantages of the invention will appear from the following description and by the claims appended thereto reference being had to the accompanying drawings in which:

Fig. 1 is a side elevational view;

Fig. 2 is a top view thereof showing a number of operating parts in section;

Fig. 3 is a side assembly view showing a number of operating parts in section;

Fig. 4 is a front elevational view shown with a number of operating parts with portions broken away;

Fig. 5 is a vertical sectional view taken on line 5—5 of Fig. 1;

Fig. 6 is a vertical sectional view taken on line 6—6 of Fig. 2;

Fig. 7 is an end view showing the casing for the motor and its supports partly in section; and Fig. 8 is a perspective view of a ticket used in conjunction with the receiving valve of the invention.

Referring to the drawings, two mounting plates 10 and 11 are held in assembled parallel relation to each other by a plurality of spacer members 12, 13 and 14 secured to the plates by pairs of screws 12A, 13A and 14A, respectively, the plates 10 and 11 being formed with bracket elements 15 and 16 best seen in Figs. 1, 3 and 7 provided for supporting a motor casing 31 which will be hereinafter described in detail.

Between the plates 10 and 11 as shown in Figs. 2, 3 and 4 is secured as by bolts 17 and 18, a casing 19 constructed of transparent material such as Lucite forming a by-pass path for the stream of air entering a rectangularly shaped ticket guiding tube element 20 made of transparent material fitted into a similarly shaped opening in the casing 19 and secured in adjusted position therein by a number of screws SC shown in Figs. 1, 2, 3, 4 and 7. The ticket guiding tube 20 is provided with series of perforations 21 at its opposite narrow sides connecting with the by-pass path formed in casing 19 and extends in juxtaposition to the engaged point of the two rollers 22 and 23 for guiding the ticket T of the form shown in Fig. 8 therebetween.

The shafts 22b and 23b of rollers 22 and 23, as shown in Figs. 3 and 6, are journaled at their ends in similar ball bearings 22a and 23a embedded in rubber supports 24 and 25 having series of peripherally disposed serrations Sr provided to permit greater axial displacement of these rollers upon the passing of a ticket or a plurality of tickets therebetween while normally holding these rollers in contacting relation to each other with a predetermined contact pressure, plates of antifriction material Y3 and Y4 being interposed between the ends of rollers 22 and 23 and the mounting plates 10 and 11.

The shaft 22b of roller 22 is operatively connected to the armature shaft 29 of a motor 28 by a belt 30 passing over a pulley 26 keyed to the shaft 22b and over a pulley 27 keyed to the armature shaft 29 of motor 28. The motor 28 as shown in Figs. 3 and 7 is provided with two supporting studs 32 and 33 secured at their ends to a cover plate 34 of casing 31 as by screws Y and Y1 extending through bushings 35 and 36 and in plate 37Y made of non-metallic material provided for insulating the motor from the cover plate 34. The wall 35 of casing 31 and the cover plate 34 which is secured to similar spacer members L formed with the casing 31 by screws X1 are provided with flange portions 37 and 38 serving for securing the casing 31 thus formed to the brackets 15 and 16 of supporting plates 10 and 11 as by a number of screws Z and Z1.

The casing 31 is formed with a tubular portion 39 for connection with a tubular portion 40 formed with the by-pass casing 19, the tubular portions 39 and 40 being connected by a closely fitted rubber sleeve 41 while a second tubular portion 42 formed at the opposite end of casing 31 serves for connecting this casing to a pneumatic tube leading to another ticket receiving valve or to the air circulator of the ticket distributing system as the case may be.

An air seal is formed on each side of the ticket guiding tube element 20 and the rollers 22 and 23 by bars 43 and 44 of graphite material fitted between the plates Y3 and Y4 and pressed against these rollers by ribbon springs 45 and 46, having their opposite end portions engaging similar slots 47 and 48 in the supporting plates 10 and 11, while hook members 49 and 50, best seen in Fig. 3, hold the graphite bars 43 and 44 in adjusted position on the rollers 22 and 23 upon the accidental rotating movement of these rollers in directions opposite to that imparted by the operations of motor 28, while the movement of the rollers 22 and 23 in the direction indicated by the arrows in Fig. 3 causes the graphite bars 43 and 44 to be pressed against the opposite sides of the ticket guiding tube 20 to form air seals between the rollers and the opposite sides of the tube.

In the operation of the ticket receiving valve of the invention the operation of motor 28 and thereby the rotation of roller 22 operatively connected to this motor by belt 30 is effective to rotate the roller 23 by friction due to the contact pressures exerted between these rollers by the rubber mountings 24 and 25. Upon the arrival of a ticket T in guiding tube 20 at the contacting or engaging point of rollers 22 and 23 as indicated in dotted line in Fig. 3, propelled by the air stream in the pneumatic tube (not shown), the ticket is gripped by the rollers and forced out of the valve to a point where it is free to fall as by gravity on the table of the ticket receiving operator, while the stream of air continues in its path to a second receiving valve or to the air circulator of the system through the series of perforations 21 in the ticket guiding tube 20, through the by-pass path in casing 19, through the tubing portions 40 and 39, through the motor casing 31 and the tubing portion 42 connecting this valve to the air circulator (not shown) of the pneumatic ticket distributing system. Conditions are met in actual service where a considerable number of tickets arrive at the receiving valve from a plurality of ticket sending valves simultaneously thus causing considerable axial displacement of the rollers 22 and 23 with the consequent added load on the transmission belt, such load being compensated for by the displacement of roller 22 in a direction to tension the belt on the pulleys 26 and 27, thereby preventing its slippage thereover and assuring the proper delivery of these tickets from the valve. According to applicant's invention, by making the ticket guiding tube 20 and casing 19 of transparent material, any blockade or mutilation of the tickets which may occur at this point which may be due to humidity, static, defective tickets or to the difference in the speed of the tickets in the pneumatic tube relative to the peripheral speed of rollers 22 and 23 may be visually observed through the window W formed in casing 19 and such tickets removed from the valve by the simple disconnecting of the ticket guiding tube 20 from the by-pass casing.

What is claimed is:

1. A pneumatic ticket receiving valve comprising two mounting plates, means for securing said plates in adjusted spaced relation to each other, each of said plates having a recess substantially representing the digit 8, a rubber mounting fitted in each of said recesses, a pair of bearings embedded in each of said rubber mountings, a pair of rollers journaled in said bearings and disposed in frictional engagement to each other by the elasticity of said mountings, and a ticket guiding tube of transparent material having its delivery end disposed in juxtaposition to the engaged point of said rollers.

2. A pneumatic ticket receiving valve comprising two mounting plates, means for securing said plates in adjusted parallel spaced relation to each other, each of said plates having a recess extending from one side thereof substantially in the form of digit 8, a mounting of resilient material fitted in each of said recesses, a pair of bearings embedded in each of said resilient mountings, a pair of rollers journaled in said bearings held in frictional engagement to each other by the elasticity of said mountings, a ticket guiding tube having its delivery end disposed in juxtaposition to the engaged point of said rollers, a casing, an electric motor housed in said casing and having its armature shaft extending from one side thereof, said casing forming an air path contiguous to said guiding tube for cooling said motor, and means operatively connecting said shaft to one of said rollers.

3. A pneumatic ticket receiving valve comprising a pair of mounting plates, means for securing said plates in assembled spaced relation to each other, a casing mounted between said plates, another casing secured to means carried by said plates, a ticket guiding tube fitted into the first-mentioned casing and having air paths forming with said casing a by-pass path for the air stream leading to the second-mentioned casing, a pair of rollers mounted for axial displacement in bearings in recesses formed in said plates, a motor housed in the second-mentioned casing to be cooled by the air stream passing therethrough, and means operatively connecting said motor to one of said rollers.

EDGAR W. GENT.